United States Patent [19]

Minot et al.

[11] 4,086,074

[45] Apr. 25, 1978

[54] ANTIREFLECTIVE LAYERS ON PHASE SEPARATED GLASS

[75] Inventors: Michael Jay Minot; Ugur Ortabasi, both of Corning, N.Y.

[73] Assignee: Corning Glass Works, Corning, N.Y.

[21] Appl. No.: 651,416

[22] Filed: Jan. 22, 1976

[51] Int. Cl.$^2$ ............................................. C03C 15/00
[52] U.S. Cl. ......................................... 65/31; 65/111
[58] Field of Search .................... 156/24; 65/31, 30 R, 65/111

[56] References Cited

U.S. PATENT DOCUMENTS

| | | | |
|---|---|---|---|
| 2,348,704 | 5/1944 | Adams | 156/24 |
| 3,374,130 | 3/1968 | Junge et al. | 156/24 |
| 3,551,228 | 10/1970 | Meth | 156/24 |
| 3,616,098 | 10/1971 | Falls | 156/24 |
| 3,647,583 | 3/1972 | De Rouw | 156/24 |
| 3,785,793 | 1/1974 | Park | 65/31 |
| 3,843,228 | 10/1974 | Yoshiyagawa et al. | 65/111 X |
| 3,938,974 | 2/1976 | Macedo et al. | 65/30 R |

FOREIGN PATENT DOCUMENTS

189,988    1/1967    U.S.S.R. .................................. 65/31

Primary Examiner—S. Leon Bashore
Assistant Examiner—Frank W. Miga
Attorney, Agent, or Firm—William J. Simmons, Jr.; Walter S. Zebrowski; Clarence R. Patty, Jr.

[57] ABSTRACT

An antireflective layer is formed on a surface of a body of phase separable glass by heat treating the glass to cause it to become separated into at least two distinct phases of different solubility. A surface of the body is subjected to a leaching solution which preferentially leaches at least the most soluble phase, leaving a surface layer consisting of a skeletal structure that comprises the least soluble phase. The leaching solution preferaby contains an acid which etches the skeletal structure which becomes so modified that the film exhibits an effective refractive index gradient thereacross, the film therefor exhibiting antireflectance properties over a wide band of wavelengths.

6 Claims, 7 Drawing Figures

(PRIOR ART)

ANTIREFLECTIVE LAYERS ON PHASE SEPARATED GLASS

CROSS-REFERENCE TO RELATED APPLICATION

This application is related to U.S. Pat. application Ser. No. 651,429, now U.S. Pat. No. 4,019,884 issued Apr. 26, 1977 entitled "Method for Providing Broad-Band Antireflective Surface Layers on Chemically Durable Borosilicate Glasses", Elmer et al., concurrently filed and commonly assigned herewith, said related application being incorporated herein by reference.

BACKGROUND OF THE INVENTION

Antireflective films or layers are commonly employed on surfaces of such optical devices as lenses, windows, filters and the like. One area of recent interest, requiring a method of greatly reduced cost and complexity, is the application of antireflection films to glass envelopes for solar energy collectors. The reduction of reflection losses occurring at the collector envelope can substantially increase collector efficiency.

In general, the reflection of light from a surface depends not only on the angle of incidence of the light, but also upon the refractive index of the material forming the surface. For a glass having a refractive index of about 1.5, the reflectance from a single surface is about 4% for light impinging at incident angles of less than about 50° from the normal.

There presently exists a highly developed technology for producing antireflective layers on the surfaces of optical devices. Heretofore, the highest quality coatings have been produced by vacuum deposition techniques. While such techniques are suitable for the batch treatment of small articles such as lenses, they are expensive and not readily adaptable to the continuous production of antireflective layers on large articles. Particular difficulty is encountered in attempting to provide antireflective layers on surfaces of articles of complex shape such as the interior walls of tubular glass envelopes for solar energy collection devices. Single-layer coatings which are simple to apply, are adequate in some applications, but they have some serious limitations. The lowest reflectance that can be attained for crown glass, for example, using practical materials, is 1.33%. Moreover, the low reflectance property is operative over a narrow band of wavelengths and rises rather sharply at wavelengths that are longer and shorter than that of the minimum reflectance. Multiple layer films have usually been employed to provide low reflectance over a broader band of wavelengths. However, the processes by which such multiple layer films are deposited are costly and complex, fifteen or more layers being required to form some commercial broad band antireflective films. Also, the transmittance of the optical device decreases as the number of layers increases.

It has been known that a single layer having a gradient refractive index can provide broad band antireflective properties. Attempts have been made to produce such a surface layer by techniques whereby leachable components are removed from the glass, leaving a skeletonized porous surface having a lower refractive index than the bulk glass. In accordance with such prior art techniques, etching is permitted to proceed to an extent sufficient to provide a skeletonized surface layer of depth approximating an odd multiple of one-fourth the wavelength of the light to be transmitted to reduce reflectance of that light by the treated surface.

Most of the known etching processes involve complex etching solutions and procedures which must be designed specifically for the type of glass composition to be treated. U.S. Pat. No. 2,348,704 to Adams, for example, describes a procedure for treating barium crown glass by removing the alkali, alkaline earth, and other bivalent metal oxides from the glass, and thereafter treating the glass with hydrofluoric acid to enlarge the pore structure of the residual siliceous layer. A single leaching step is taught in U.S. Pat. Nos. 2,486,431 to Nicoll et al. and 2,490,662 to Thomsen which describe methods for treating soda-lime glasses or optical crown glasses with complex, silica-saturated solutions of fluosilicic acid, in order to provide antireflective surface films thereon. The Nicoll et al. and Thomsen etch solutions are complex, and if the solution is not sufficiently saturated it will completely dissolve the glass surface. Moreover, if it is over saturated, it will lay down a coat of $SiO_2$ on the glass surface. It is stated in the aforementioned U.S. Pat. No. 2,490,662 that the treating solution dissolves out of the surface of the glass substantially all of the metallic oxides and some of the silica thereby producing a zone very shallow in depth consisting of silica molecules. It is further stated that it appears that silica is simultaneously dissolved from the glass surface and redeposited at spaced points. The solutions are subject to rapid chemical change, hence requiring constant careful monitoring. In general, prior art etching processes resulted in surface films which had low abrasion, weather and chemical durabilities. These methods are not effective to produce efficient antireflective surface layers on durable glasses such as borosilicate glasses. As noted by L. Holland in *The Properties of Glass Surfaces*, Wiley & Sons, New York, (1964) on pages 155 and 165, acid etching processes did not produce antireflective films on the surfaces of chemically-durable borosilicate glasses. Holland points out that the production of antireflective films by chemical etching was deemed of little practical value in view of the weak and optically inefficient nature of the films so produced. A further disadvantage of prior art processes is the inability to control the optical and physical characteristics of the film by controlling such parameters as the shape, size and density of pores in the surface layer.

SUMMARY OF THE INVENTION

It is therefore an object of the present invention to provide a method of forming broad band antireflective surface layers on phase separable glasses. A further object is to provide such a method whereby improved optical characteristics can be obtained by controlling the density, size and shape of pores in such surface layers.

Briefly, the present invention pertains to a method of forming a porous antireflective surface layer on a glass article. Initially, there is provided an article of phase-separable glass which, upon heat treatment, is capable of separating into at least two phases of different solubility. The glass article is heated to a temperture under the phase separation liquidus temperature, said temperature being sufficiently high and being applied for a sufficient duration of time to induce phase separation in the glass. Since it is not presently known whether phase separable glasses are completely homogeneous prior to receiving a phase separation heat treatment or instead comprise a plurality of microphases so small as to be undetectable by an electron microscope, the step of "including phase separation" is intended to include the growth of microphases from a state of imperceptibility as well as the initiation of growth of microphases from a homogeneous glass. Thereafter, the glass article is contacted with an aqueous treating solution for a time sufficient to leach from a surface layer of the article the more soluble of the phases, at least the least soluble of the phases remaining as a porous skeletonized layer which exhibits a gradient refractive index thereacross.

The resultant skeletonized surface layer comprises at least the least soluble of the phases initially present in the phase separated glass. The layer has a thickness less than 10,000A and exhibits a gradient refractive index which is such that the reflectance of the layer is less than 0.25% throughout the visible region of the spectrum for each surface.

DETAILED DESCRIPTION

The production of antireflective surface layers in accordance with the present invention requires that the glass body be subjected to a predetermined phase separation heat treatment and a subsequent chemical treatment in a leaching solution. The heat treatment of the glass causes the formation and/or growth of two or more phases, at least one of which is substantially more soluble than the others. Following the heat treatment, the glass article is subjected to a solution in which the more soluble phase is readily dissolved away leaving the skeletonized layer comprising at least the least soluble phase. The soluble phase is removed by leaching; however, it may be desirable to incorporate in the chemical treatment solution an etchant capable of attacking the less soluble phase to enlarge the pores. Since the composition of the phase separable glass and the time and temperature of the initial heat treatment determine the characteristics of the antireflective layer, the optical characteristics of the resultant optical device can be tailored to provide broad band, low reflectance properties that were heretofore unattainable with durable films. Moreover, this invention permits the use of durable glasses which were heretofore unacceptable for use in forming porous antireflective surface layers.

Glasses suitable for treatment in accordance with the present invention are those which develop at least two phases of different solubility when subjected to a controlled heat treatment. Such glasses are well known. U.S. Pat. Nos. 2,106,744, 2,215,039, 2,221,709, 2,315,329, 2,340,013, 2,480,672, 3,758,284 and 3,785,793 discuss phase separation and growth in borosilicate glasses. A large portion of the text "Structure & Crystallization of Glasses" by W. Vogel, Pergamon Press, edition Leipzig, 1971 is devoted to phase separable glasses. It is pointed out on pages 80-81 of that text that the microstructure into which the various phases form is determined by such factors as concentration of the main glass components, the temperature history of the glass, the field strength of the cations present in the glass, trace additions of particular ions such as sulphates, and the surrounding gas atmosphere.

The composition of the phase separable glass must be such that a suitable antireflective layer can be formed by heat treating and leaching the glass article. For example, the physical characteristics of the resultant antireflective layer, such as its expansion properties, must be compatible with those of the bulk glass. Shrinking of hydrated layers on drying can deleteriously affect antireflective layers. For example, some glasses, when subjected to the method of the present invention, form antireflective layers which initially appear to be acceptable but which begin to craze and flake upon drying. Those compositions which ultimately result in a film which contains such defects as frosting, flaking, spalling and the like are not within the scope of the present invention. Some phase separable glasses which become cloudy when subjected to a phase separation heat treatment may not be useful for optical devices due to the low transmissivity thereof, but they still may be useful in architectural applications, for example, wherein low reflectivity but not high transmissivity is required.

Preferred glass compositions are the chemically-durable borosilicate glasses in which phase growth can be induced by heat treatment. These include the very durable aluminoborosilicate glasses, as well as the somewhat durable borosilicates containing minor modifying additions of other oxides. Suitable compositions include, in weight percent on the oxide basis, about 55-82 wt.% $SiO_2$, 12-30 wt.% $B_2O_3$, 2-12 wt.% total of alkali metal oxides, and 0-7 wt.% $Al_2O_3$, these constituents constituting at least about 93 wt.% of the glass. The alkali metal oxides may be selected from the group consisting of $Na_2O$, $K_2O$ and $Li_2O$. The glasses may contain minor additions of certain other oxides provided these additions do not deleteriously effect the durability or phase separation and growth characteristics of the glass. Examples of such oxides include PbO, $P_2O_5$, MgO, CaO, BaO and the like. However, the total of any such oxide additions should not exceed about 4 wt.% if the required chemical and physical properties are to be maintained. Glasses containing less silica or more $B_2O_3$ or alkali than specified exhibit insufficient chemical durability for use in the invention, whereas glasses containing excessive $SiO_2$ and insufficient alkali and $B_2O_3$ either do not exhibit the phase-separation characteristics required for the production of antireflective surface layers or are difficult to melt. The presence of $Al_2O_3$ in amounts ranging about 1-4 wt.% is helpful in maintaining chemical durability. An example of a particularly suitable glass for the production of antireflective surface layers is Corning Code 7740 glass, commercially available from Corning Glass Works, Corning, New York, 14830.

After a glass composition has been selected, the particular phase separation heat treatment to which it is subjected can influence structural and compositional features of the microporous surface layer, thereby determining the optical characteristics and durability features of the resultant antireflective layer. A discussion of the effect of various heat treatments on phase separable glasses can be found in the aforementioned U.S. Pat. No. 2,106,744. The heat treatment, to some extent, depends upon the composition chosen and generally comprises heating the glass at a temperature above 500° C but below a temperature, herein referred to as the phase separation liquidus temperature, above which the distinct phases of the glass can be made to essentially disappear or revert to miscibility. At temperatures below about 500° C viscosities are too high to permit a phase separation that can be of value for the process of the present invention. As would be expected, higher temperatures require shorter heat treatment periods. Borosilicate glasses should be heat treated at a temperature above 525° C, but below about 750° C, the phase separation liquidus temperature for such glasses. Whereas the heat treatment at 525° C would require a few days, only a few hours would be necessary at temperatures around 600° C, for example. The heat treatment may be carried out upon cooling of the glass body after it has been formed from the melt or after it has been cooled to room temperature. If the glass composition is such that phase separation readily occurs upon cooling from the melt, the glass article being formed may be rapidly quenched to the desired temperature within the phase separation range and then held for the desired period of time.

When heat treating a glass article which is at room temperature, different types of phase separation and phase growth occur depending upon whether the article is heated to a temperature above the phase separation liquidus temperature prior to being subjected to a temperature lower than the phase separation liquidus temperature. A discussion of various heat treatments of borosilicate glasses and the types of phase separation which result therefrom can be found in the publication "Phase Separation in Borosilicate Glasses as Seen by Electron Microscopy and Scanning Electron Microscopy", T. H. Elmer et al., Journal of the American Ceramic Society, Vol. 53, No. 4, April, 1970, pp. 171-175. In general, when the glass is subjected to heat treatment, the microphases increase in size with temperature and time. If the glass is heated above its phase-separation liquidus temperature and then allowed to cool to the desired temperature of heat treatment, the phase having the higher surface tension will assume a droplet form with little tendency for these droplets to coalesce to form an interconnecting phase. However, if the glass is heated to a temperature less than the phase separation liquidus temperature, the phase separated structure of both phases is of the wormy interconnected type rather than discrete particles or droplets. The soluble phase is more readily leached when it has such an interconnected or continuous structure. The microstructure becomes coarser with longer heating times and/or higher temperatures. The ability to control the size and shape of the glass microstructure by controlled heat treatment permits tailoring of the optical and physical characteristics of the resultant film.

Some of the practical applications of the present invention include display windows, green house windows, solar collectors and the like. Since such devices are exposed to a variety of naturally occurring weather conditions as well as to airborne pollutants, it is desirable to employ as substrate materials durable glasses such as the aforementioned chemically durable borosilicate glasses. In order to obtain useful antireflective characteristics, such glasses are preferably heated to a temperature in the range of about 550°-700° C. for a time in the range of about 1-10 hours, preferably about 1-5 hours, and thereafter slowly cooled to room temperature.

In accordance with the aforementioned Elmer et al. patent application, borosilicate glasses within a limited composition region are heat treated at a temperature in the range of about 630°-660° C for a time in the range of about 1-4 hours to obtain the separated phase characteristics required for extremely broad-band antireflective properties, i.e., a reflectivity less than 1% between about 0.35 and 2.5 μm. Preferred glass compositions for this purpose are the alumino borosilicate glasses which contain low concentrations of non-essential oxides such as PbO, $P_2O_5$, CaO, MgO, BaO and the like. Operative glasses for this purpose consist essentially, in weight percent on the oxide basis, of about 72-82% $SiO_2$, 13-16% $B_2O_3$, 3-10% alkali metal oxides and 0-4% $Al_2O_3$, these oxides constituting at least about 93% by weight of the glass.

During the manufacture and/or heat treatment of the described borosilicate glasses, a glassy layer which is rich in silica is formed on surface portions of the glass. This layer retards extraction of the soluble phase formed in the glass on heat treatment. Formation of the skin can be prevented by controlling the gas atmosphere surrounding the glass during forming and annealing. If a skin does form on the surface of the phase separable glass, it is desirably removed prior to or during the removal of the soluble phase. Removal may be accomplished by any conventional means, including mechanical grinding or chemical etching procedures. However, the preferred method is to chemically remove some silica while leaching the soluble phase by means of solutions containing both hydrogen and fluoride ions, for example, solutions containing HF or $NH_4F.HF$. Concentrated solutions of these fluoride compounds comprise the most convenient means of removal. Reaction times are considerably reduced when 10% $NH_4F.HF$ is used in conjunction with 0.52N $H_2SiF_6$. Hot concentrated NaOH has also been employed for skin removal.

It is known that the soluble phase present in phase separated glasses can be removed by a variety of media, including pure water and any of a number of aqueous solutions of mineral acids. Some suitable film forming solutions are HF, NaOH and $NH_4F.HF$ alone or combined with $HNO_3$, $N_2SiF_6$ or $H_2SO_4$. Other suitable solutions include $H_3PO_4$, HCl, $NH_4F$ and $Na_2CO_3$. Considerations such as reaction time, pollution and the like may determine the particular chemical treatment solution to be employed. For example, ammonium bifluoride alone produces effective antireflective layers. However, the reaction time for this process is considerably longer than that required when ammonium bifluoride is combined with another acid. Nitric acid combined with ammonium bifluoride has been found to be effective in the formation of antireflective layers on borosilicate glasses. However, fluosilicic acid combined with ammonium bifluoride does not pose the environmental-waste treatment difficulties that result from the use of nitric acid and ammonium bifluoride.

The chemical reaction which forms the antireflective layer may take place over a wide range of operating temperatures. To determine the effect of temperature this reaction was performed at 45° C and 80° C. The higher reaction temperature appears to be preferred because film formation proceeds more rapidly and is less sensitive to slight errors in process timing for a given glass composition. Moreover, it has been found that the sensitivity of the resultant optical properties of a layer to the duration of the chemical leaching treatment is a function of the phase separation heat treatment temperature. The optical properties of samples prepared at 630° C, for example, were less sensitive to errors in process timing than similar samples phase separated at 600° C. Also, as stated hereinabove, broad-band reflectivity in the near infrared region of the spectrum as well as the visible region can be achieved by a phase separation heat treatment between about 630° C and 660° C. It is noted that the benefits of a high temperature phase separation treatment in terms of less sensitive process timing and broad-band low reflectance into the infrared region of the spectrum are in part offset by the potential for thermal deformation of the article being treated, e.g., sagging or warping of tubes. The phase separation heat treatment should therefore be determined in accordance with the optical properties mandated by the specific application. In solar energy applications, for example, a low reflectance effect from 0.35 to 0.1 micrometers may be adequate, and a lower temperature heat treatment at about 600° C or less could be employed to avoid sagging of the glass tube.

Figure 1:
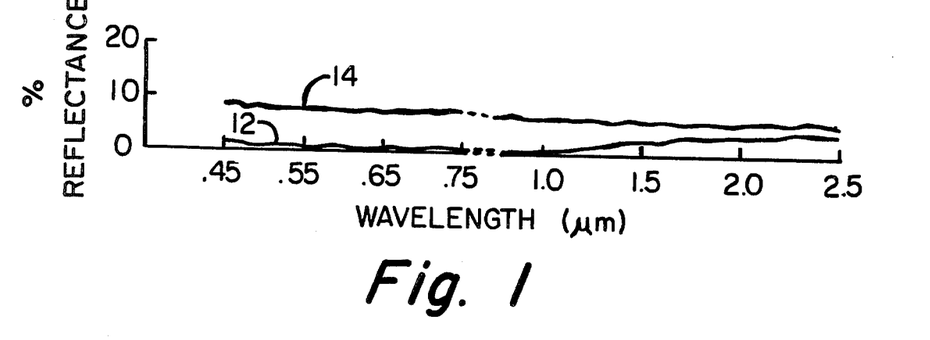
FIGS. 1 and 4 are graphs showing percent reflectance v. wavelength of light.
Figure 2:
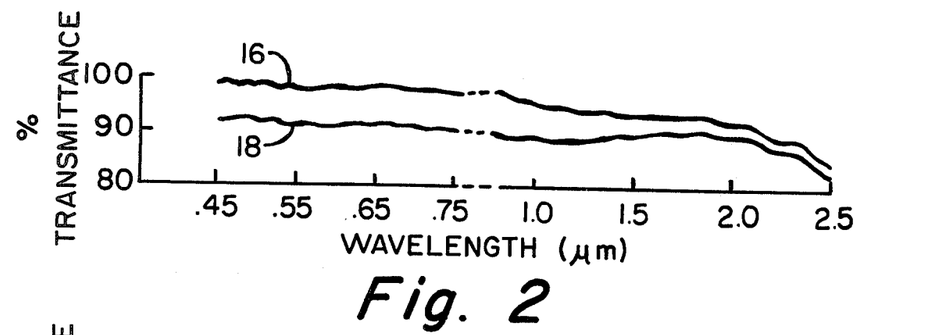
FIGS. 2 and 5 are graphs showing percent transmittance v. wavelength of light for films produced in accordance with the method of the present invention. A break in each of the curves of these figures is indicative of the fact that each curve is a composite of curves obtained by two different instruments.

The invention may be further understood by reference to the following detailed examples. The compositions of most of the glasses employed in the examples are set forth in the table below, wherein the percentages of the constituent parts are set forth as calculated from the glass batches in weight percent on the oxide basis.

slowly increase in the near infrared region, increasing to about 6% at 2.5 μm. This compares with a reflectance of about 8% throughout the spectrum for the untreated glass blank, as illustrated by curve 14. A comparison between curves 16 and 18 reveals that percent transmission is increased about 6% in the visible region.

Figure 3:
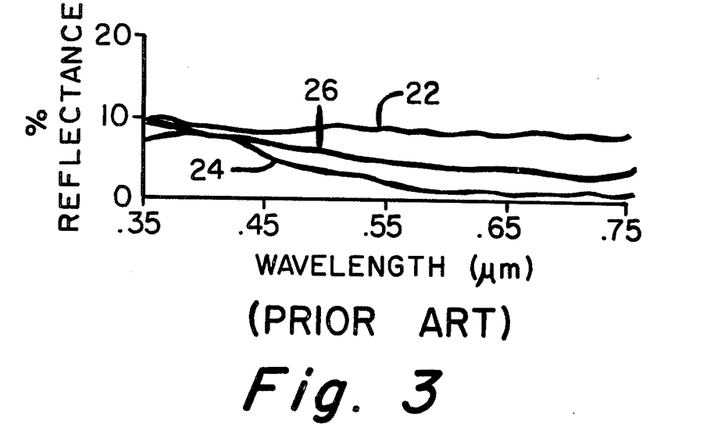
FIG. 3 is a graph showing percent reflectance v. wavelength for films produced in accordance with two prior art methods.

The antireflective and durability characteristics of layers produced in accordance with the present invention are superior to those layers formed by prior art etching techniques. A typical prior art antireflective layer may be provided on a soda-lime-silica glass by treatment in a silica rich fluosilicic acid solution in accordance with the following procedure. A small piece of soda-lime-silica glass is thoroughly cleaned by washing in a detergent solution, briefly etching in 0.5 wt.% HF and rinsing in hot distilled water. A skeletonized surface film is formed by immersing the clean glass for 75 minutes in a 1.25 molar fluosilicic acid solution (45° C) which has been saturated with about 1.5 millimoles of silica per liter. As shown by curve 24 in FIG. 3, the resultant film is highly non-reflective between about 0.6 μm and 0.75 μm, but its reflectance is higher than that of the layer represented by curve 12 of FIG. 1 at wavelengths outside this band. Also, this prior art film is poorly durable, being easily removed by rubbing.

Another prior art technique concerns forming more durable films by modifying the poorly durable film described above. The poorly durable skeletonized film described above is subjected to a 25° C treatment for 40 hours in 1.25 molar fluosilicic acid solution supersaturated with about 15 millimoles of silica per liter. As illustrated by curve 26 of FIG. 3 the reflectance of the resultant film is about 50% less than that of the untreated glass. The film is much more durable than the initially formed skeletonized film and cannot be scrubbed off in detergent solution. In contrast with these prior art techniques the method of the present invention, as typified by Example 1, is advantageous in that it results in antireflective layers which are durable and which exhibit broad band, low reflectance properties.

To ascertain the durability of antireflective layers produced in accordance with the present invention a plurality of samples of glass having composition D of Table I were subjected to the treatment set forth in Example 1. The average transmittance of these samples at 0.4 μm and 0.7 μm was 98.6% and 98.8%, respectively. These samples were subjected to a series of tests to evaluate their durability.

To check for chemical durability one sample was immersed in distilled water at 95° C. for 1 hour. The transmittance after this test was 98.4% at 0.4 μm and 98.4% at 0.7 μm. After being subjected to 5% HCl at 95° C. for 1 hour, the transmittance of a second sample was 98.6 at both 0.4 and 0.7 μm. Another sample was immersed in 4.5% NaCl solution at 25° C. for 24 hours, after which its transmittance was determined to be 98.6% at 0.4 μm and 97.9% at 0.7 μm.

TABLE I

|  | A | B | C | D | E | F | G | H | I | J | K | L | M | N | O | P | Q | R | S | T |
|---|---|---|---|---|---|---|---|---|---|---|---|---|---|---|---|---|---|---|---|---|
| $SiO_2$ | 79.1 | 77.4 | 68.0 | 80.5 | 68 | 61.6 | 75 | 70 | 65 | 60 | 55 | 70 | 55 | 70 | 80 | 75 | 65 | 70 | 60 | 55 |
| $B_2O_3$ | 14.7 | 15.4 | 26.0 | 12.9 | 25 | 28.2 | 20 | 25 | 22 | 30 | 30 | 25 | 35 | 27.5 | 15 | 20 | 30 | 15 | 25 | 30 |
| $Al_2O_3$ | 1.6 | 1.9 | 1.3 | 2.2 |  | 1.9 |  |  |  |  |  |  |  |  |  |  |  |  |  |  |
| $Na_2O$ | 2.5 | 5.3 | 4.2 | 3.8 | 7 | 8.0 |  |  |  |  |  | 5 | 10 | 2.5 |  |  |  |  |  |  |
| $K_2O$ | 1.9 |  | 0.5 | 0.4 |  |  | 5 | 5 | 13 | 10 | 15 |  |  |  |  |  |  |  |  |  |
| $Li_2O$ | 0.2 |  |  |  |  |  |  |  |  |  |  |  |  |  | 5 | 5 | 5 | 15 | 15 | 15 |
| CaO |  |  |  | 0.2 |  |  |  |  |  |  |  |  |  |  |  |  |  |  |  |  |
| $As_2O_3$ |  |  |  |  |  | 0.3 |  |  |  |  |  |  |  |  |  |  |  |  |  |  |

EXAMPLE 1

A piece of glass tubing having composition D of Table I is heated in an electric furnace to a temperature of about 600° C, maintained at that temperature for about 3 hours, cooled at a rate of 100° C./hour to room temperature and removed from the furnace.

Following heat treatment the phase-separated glass tubing is etched for 30 minutes in a 10% (weight) aqueous solution of $NH_4F \cdot HF$ to remove the siliceous surface skin present on the glass. Thereafter, the etched glass is immersed in a treating solution consisting of 0.15% (weight) solution of $NH_4F \cdot HF$ in water and 0.26N $H_2SiF_6$, the latter of which was prepared by adding 50 ml concentrated (30%) $H_2SiF_6$ to 950 ml distilled water. The temperature of this layer-forming solution is 45° C. The immersion is continued for five minutes after which the glass tubing is removed, rinsed in distilled water, dried, and cut into sections which are examined.

A treated section of the tubing has a surface layer exhibiting a blue-green coloration when viewed in reflected light. The surface reflection of the treated glass is markedly reduced. Curves 12 and 16 of FIGS. 1 and 2, respectively illustrate the reflectance and transmittance of the sample produced in accordance with Example 1 plotted as a function of wavelength. The total reflectance of both surfaces is less than 0.5% throughout the visible portion of the spectrum, and it begins to In simulated weathering tests, one sample was subjected to 98% relative humidity at 50° C. for 1 week, after which its transmittance was 98.9% at 0.4 μm and 98.2% at 0.7 μm. Another sample was subjected to salt fog, a mist of 5% NaCl at 35° C. for 1 week; its transmittance was then determined to be 98.2% at 0.4 μm and 98.0% at 0.7 μm.

The antireflective layers were also tested for endurance when subjected to thermal shock. One sample was heated to 140° C. in an oven, and then quickly plunged into ice water. Its transmittance was 98.1% at 0.4 μm and 98.6% at 0.7 μm. Another sample was soaked for 3 days in water at 25° C., and then, without having been dried, it was immersed into liquid nitrogen at −196° C. The transmittance of this latter mentioned sample was 98.0% at 0.4 μm and 97.8% at 0.7 μm after the thermal shock test.

It is noted that the high transmittance of each of the samples was not significantly reduced in any of the aforementioned durability tests.

EXAMPLE 2

Another piece of glass tubing having composition D of Table I is subjected to a phase separation heat treatment identical with that described in Example 1. Following heat treatment, the phase-separated glass is etched for 30 minutes in 10% (weight) aqueous solution of $NH_4F \cdot HF$ to remove the surface skin. Thereafter, the tubing is immersed in a treating solution having the same composition as that specified in Example 1 but having a temperature of 80° C.

Following treatment in this solution for 1.5 minutes, the glass tubing is removed, rinsed in distilled water, dried, and cut into sections which are examined. An antireflective surface layer exhibiting a deep blue coloration in reflected light is observed. The reflectance and transmittance curves of this sample are essentially identical to curves 12 and 16 of FIGS. 1 and 2.

EXAMPLE 3

Figure 4:
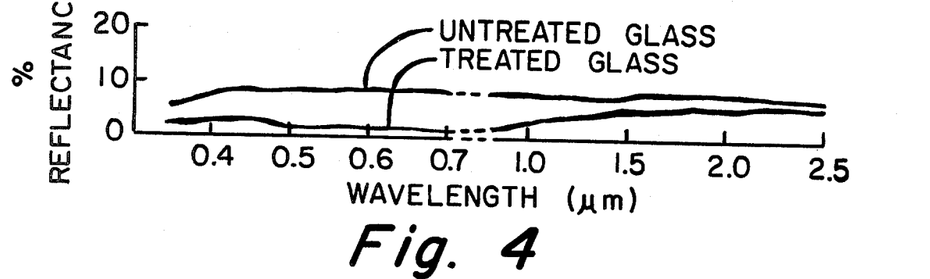
Figure 5:
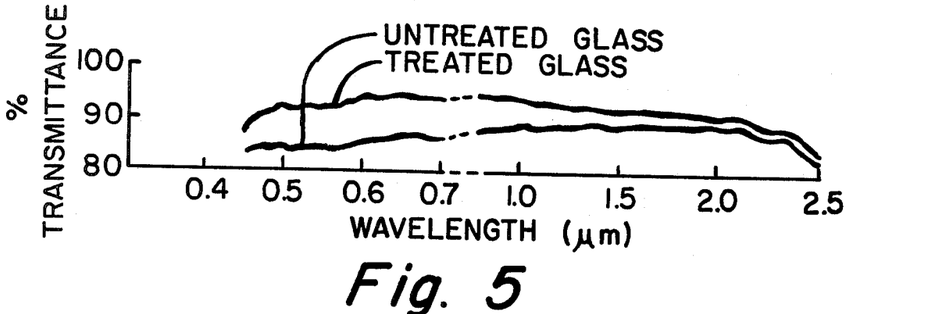

To determine the feasibility of using antireflective layers produced by the method of the present invention in ophthalmic applications, a sample of photochromic glass was provided, the composition of which was approximately, in weight percent as computed from the batch: 55.5% $SiO_2$, 16.1% $B_2O_3$, 8.9% $Al_2O_3$, 6.73% BaO, 5.07% PbO, 2.08% $ZrO_2$, 1.83% $Na_2O$, 2.65% $Li_2O$, 0.034% CuO, 0.162% Ag, 0.274% Cl, 0.56% Br and 0.2% F. The sample was subjected to a 3 hour phase separation heat treatment at 575° C and permitted to cool at a rate of 100° C per hour. It was then subjected to a 10 minute skin removing treatment in 10 wt.% $NH_4F \cdot HF$ at room temperature and was thereafter subjected to a solution of 0.1 wt.% $NH_4F \cdot HF$ and 0.16 N $HNO_3$ for 3 minutes. The sample was removed from the solution, rinsed and air dried. A deep blue color indicative of an antireflective layer was apparent when the sample was viewed in reflected light. FIGS. 4 and 5 show the reflectance and transmittance curves for the sample of photochromic glass before and after treatment. Reflectance is reduced from 8 percent to 1 percent in the visible portion of the spectrum while the transmission improved from 85 percent to between 92 and 93 percent.

Examples 1 and 2 pertain to glass articles which have the same composition and which are subject to similar phase separation heat treatments and skin removal treatments. Although the same leaching solution is employed in both examples, the solution temperature is 45° C and 80° C for Examples 1 and 2, respectively. The respective reaction times of 5 minutes and 1.5 minutes are optimal for the two leaching solution temperatures employed, i.e., they are the shortest times in which a layer of minimum reflectance can be formed.

Under certain conditions of film formation percent reflectance measured at a specific wavelength is a cyclic function of leaching time. To illustrate this relationship a plurality of samples of glass of composition D were subjected to the same phase separation heat treatment and surface skin removal treatment which are described in Example 1. The samples were then subjected to leaching solutions of the type described in Examples 1 and 2 for different periods of time. As indicated in Table II the films first appear to be a straw colored yellow brown, then become a deeper red brown, a light blue, a blue and then a violet color. The color cycle repeats, although with some variation in color with longer reaction times.

TABLE II

| Sample No. | Leaching Solution Temperature | Reaction Time (min) | Appearance in Reflected Light |
|---|---|---|---|
| 1 | 45° C | 2 | yellow brown |
| 2 | " | 3 | pink brown |
| 3 | " | 4 | red brown |
| 4 | " | 5 | blue green |
| 5 | " | 5½ | blue violet |
| 6 | " | 6 | yellow brown |
| 7 | " | 7 | violet brown |
| 8 | " | 8 | blue violet |
| 9 | " | 8½ | yellow brown |
| 10 | " | 9 | yellow brown |
| 11 | " | 10 | blue violet |
| 12 | " | 12 | deep blue violet |
| 13 | " | 14 | deep blue violet |
| 14 | " | 15 | yellow brown |
| 15 | " | 20 | green violet |
| 16 | " | 25 | brown violet |
| 17 | " | 30 | brown violet |
| 18 | " | 35 | yellow brown |
| 19 | 80° C | ½ | brown violet |
| 20 | " | 1 | brown violet |
| 21 | " | 1½ | deep blue |
| 22 | " | 2 | deep magenta |
| 23 | " | 3 | blue |
| 24 | " | 4 | light brown |
| 25 | " | 7 | brown |
| 26 | " | 12 | blue |

The changing visual appearance of the films in reflected light corresponds to changes in spectrophotometric reflectance curves. The percent reflectance at 0.7 μm was compared for each of the samples listed in Table II. For samples 1 through 18, wherein the reaction temperature is 45° C, a minimum reflectance of about 0.5% was attained in 5 minutes, whereas a minimum reflectance of about 0.1% was attained in 1.5 minutes when the reaction temperature was 80° C. Also, percent reflectance cyclically increased to maxima around 3.5% for the 45° C reaction temperature, whereas the cyclic variations for the 80° C reaction temperature were significantly lower. The higher reaction temperature is thus faster, and the process timing at the higher temperature is less critical.

Figure 6:
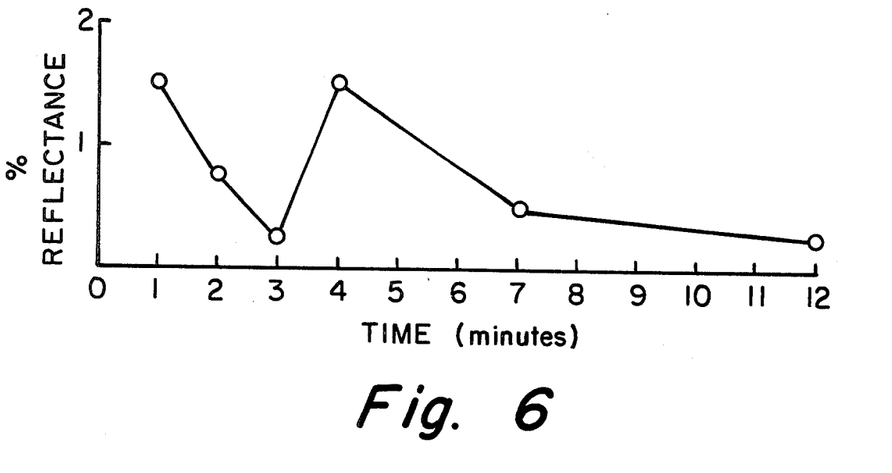
FIGS. 6 and 7 are graphs showing percent reflectance v. leaching reaction time at 0.7 μm for phase separation heat treatment temperatures of 630° C. and 660° C., respectively.
Figure 7:
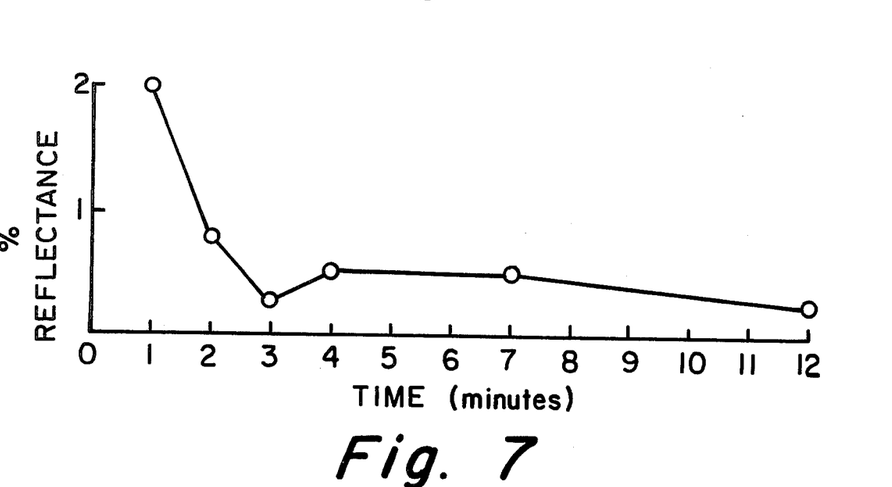

The samples described above were all phase separated at 600° C for 3 hours. As previously mentioned, the phase separating heat treatment ultimately defines the structure of the porous film and would be expected to strongly influence the optical properties of the antireflective layer produced. To investigate the effect of phase separation heat treatment temperature on the variation in percent reflection with respect to time duration of the chemical leaching treatment, two groups of glasses were heat treated in the 630°–660° C. range as specified in the aforementioned Elmer et al. application, a first group of samples were subjected to a phase separation heat treatment of 660° C for 3 hours, and another group of samples were subjected to a phase separation heat treatment of 630° C for 3 hours. The composition of all of these samples was the same as that employed in the preparation of the samples listed in Table II, i.e., composition D of Table I. The six samples in each heat treatment category were subjected to film forming solutions consisting of 0.15 weight percent $NH_4F.HF$ and 0.26 N $H_2SiF_6$ maintained at 80° C. The reaction times for samples 1 through 6 of each group were 1 minute, 2 minutes, 3 minutes, 4 minutes, 7 minutes and 12 minutes. The films of both groups of samples produced at different reaction times appeared to vary only slightly in their appearance when viewed in reflected light, all films being different shades of blue. A 3 minute reaction time was found to be optimal for samples heat treated at 660° C and for samples heat treated at 630° C. FIGS. 6 and 7 show plots of percent reflectance, measured at 0.7 μm, versus reaction time for films heat treated at 630° C and 660° C, respectively. The cyclic type behavior described in conjunction with the samples listed in Table II is practically nonexistent in FIGS. 6 and 7. The fluctuations in FIG. 7 are no greater than 0.25 percent, which is about the precision of the measurement apparatus employed.

It is therefore evident that each individual process will have to be analyzed to determine the length of time that the phase separated glass body must be subjected to a leaching solution. For a particular glass, phase separation heat treatment and leaching solution, the reflectance will decrease to a minimum and thereafter begin to increase and decrease with increased leaching time. Since it is preferable to process a sample in as short a time as possible, the time required to attain the first minimum reflectance level should be determined and should thereafter be employed for that particular glass and set of heat treatment and leaching parameters.

In accordance with the method of the present invention antireflective layers can usually be formed on a given glass by treating it in one of a variety of different kinds and strengths of film forming solutions. This is in contrast with prior art methods wherein specific solutions in very carefully controlled concentrations had to be employed for a particular glass. In prior art methods chemical action at the glass surface selectively removes certain leachable components leaving behind a skeletonized porous surface. Complex chemical etch baths were often employed which selectively acted on certain components of the glass while not affecting the other components. Whereas the etch/leach step of the present invention requires only a few minutes, that of the prior art typically requires more than 1 hour. The relatively long etch reaction times of prior art methods were probably due to the fact that film formation resulted from two competing reactions. While the glass was being selectively leached to form a porous film, the top surface of the film was being dissolved away. The rate of film formation depended on the relative rate of the leaching action versus the rate at which the top surface dissolves. The etch solutions were therefore complex, involving fluosilicic acid carefully saturated with silica. If the solution were not sufficiently saturated it completely dissolved the glass surface, and if it were oversaturated, it would lay down a coat of $SiO_2$ on the surface. Such solutions are subject to rapid chemical change, hence requiring constant careful monitoring.

A few of the film forming solutions which may be employed in the method of the present invention are listed In Table III wherein their effect on various borosilicate glass compositions A, B, C, E and F of Table I are described.

TABLE III

| Ex. | Glass | Film Forming Solution (duration) | Film Description |
|---|---|---|---|
| 4 | A | 0.1% $NH_4F.HF$ + 0.16N $HNO_3$ | Light brown non-reflecting film |
| 5 | A | 10% HF (2 min) | Non-reflecting film |
| 6 | B | 0.2% $NH_4F.HF$ + 0.16N $HNO_3$ | Purple yellow non-reflecting film |
| 7 | C | 0.1% $NH_4F.HF$ (10 min) | Non-reflecting film |
| 8 | E | 0.1% $NH_4F.HF$ (10 min) | Non-reflecting film |
| 9 | F | 1.8 M NaOH 45° C (5 min) | Non-reflecting film |

Each of these glasses is initially heated to 600° C. for 3 hours and thereafter cooled at a rate of 100° C. per hour. the glasses of Examples 4, 7 and 8 are then briefly etched for 30 minutes in 10% (weight) aqueous $NH_4F.HF$ at 45° C. to remove the silica-rich surface layer present thereon. Example 6 is subjected to a similar surface etching treatment except that the etching solution is at room temperature. Examples 5 and 9 are not treated to remove the surface layer.

While some glass compositions may be treated in any of the film-forming solutions set forth herein to form useful non-reflective layers thereon, some compositions may be incompatible with a given film forming solution. For example, glass F of Table I was heat treated in the same manner as the glasses listed in Table III and then etched for 30 minutes in 10% (weight) aqueous $NH_4F.HF$ for 30 minutes at 45° C. The glass was then immersed in a treating solution consisting of 0.1% (weight) $NH_4F.HF$ for 10 minutes. An excellent non-reflective layer was initially observed; however, it flaked off the glass as it was dried. Example 9 of Table III is thus illustrative of the fact that certain film forming solutions can produce acceptable non-reflective films on a given glass where other film-forming solutions have failed to do so.

It is well known that some glasses spontaneously phase separate upon slow cooling from the melt, the aforementioned Hood et al. patent teaching a number of such glasses having compositions in the ternary system $R_2O - B_2O_3 - SiO_2$, the term "$R_2O$" meaning any one of the three alkalies, $Li_2O$, $Na_2O$ and $K_2O$, or combinations thereof. Of the various glasses melted, glasses G through T of Table I were found to form non-reflective layers when treated in accordance with the following method. The glasses were melted in covered platinum crucibles, poured as one-fourth inch patties, and permitted to slowly cool. They were given no special anneal or heat treatment to induce phase separation, having become phase separated during cooling from the melt. The glasses were evaluated for their ability to form porous type antireflective layers when subjected to boiling water. The volume of the water compared to that of the glass sample was kept large to insure that the effective film-forming solution was just the water and not water containing dissolved glass components. Samples were qualitatively evaluated for formation of non-reflective layers by observing their appearance in reflected light. The results of this survey are summarized in Table IV along with the duration of the boiling water treatment to which the glasses were subjected.

TABLE IV

| Glass | Treatment time (min) | Film Description |
|---|---|---|
| G | 30 | Durable Blue AR Film |
| H | 30 | No Effect |
| I | 30 | Deep Blue Durable AR Film |
| J | 15 | Blue Violet AR Film |
| K | 30 | Deep Blue Film |
| L | 22 | Light Blue Film |
| M | 52 | Brown Film |
| N | 22 | Durable Violet Blue Film |
| O | 60 | Deep Violet Non-Reflecting Film |
| P | 60 | Light Purple Non-Reflecting Film |
| Q | 60 | Light Purple Non-Reflecting Film |
| R | 30 | Blue Non-Reflecting Film |
| S | 30 | Deep Violet-Green Non-Reflecting Film |
| T | 30 | Brown Non-Reflecting Film |

Table IV indicates that glass H had no non-reflective layer after being boiled in water for 30 minutes. However, this glass did show evidence of a non-reflective layer after being immersed for 20 minutes in a 10% (weight) $NH_4F \cdot HF$ skin-removing solution and thereafter being boiled in water for 10 minutes. Table V lists the reflective and transmissive properties of the resultant films. The asterisks in Table V indicate that meaningful transmission measurements could not be made on glasses L and S because of inclusions in the glass.

TABLE V

| Glass | Reduced Reflection | Enhanced Transmission |
|---|---|---|
| G | 1% 0.35 – 0.7μm | 1 – 2% 0.35 – 2.5μm |
| H | 1 – 2% 0.35 – 0.7μm | 1 – 2% 0.35 – 2.5μm |
| I | 1 – 2% 0.35 – 0.7μm<br>0 – 1% 0.7 – 2.5μm | 1% 0.35 – 0.7μm |
| J | 1 – 3% 0.35 – 0.7μm<br>0 – 1% 0.7 – 2.5μm | 2 – 3% 0.35 – 0.7μm |
| K | 4 – 6.5% 0.35 – 0.7μm<br>2 – 5% 0.7 – 2.5μm | 4 – 6% 0.35 – 0.7μm |
| L | 1 – 2% 0.35 – 2.5μm | * |
| M & N | 10% 0.35 – 0.4μm<br>4 – 5% 0.4 – 0.7μm<br>2 – 3% 0.7 – 2.5μm | 4 – 5% 0.5 – 0.7μm<br>1 – 2% 0.7 – 2.5μm |
| O & P | 3 – 4% 0.35 – 0.7μm | 3 – 4% 0.35 – 0.7μm |
| Q | 2 – 3% 0.35 – 2.5μm | 2 – 5% 0.35 – 2.5μm |
| R | 4 – 7% 0.35 – 0.7μm<br>1 – 2% 0.7 – 2.5μm | 5% 0.35 – 0.7μm<br>2% 0.7 – 2.5μm |
| S | 5 – 7% 0.35 – 0.75μm<br>2 – 6% 0.7 – 2.5μm | * |
| T | None observed | 3% 0.7 – 2.5μm |

Available evidence suggests that the layers are predominantly porous silica, have an apparent thickness in the range of about 1000–10,000Å, and exhibit that kind of antireflective characteristics that is provided by a graded refractive index layer. An optimal refractive index gradient can be obtained by the method of the present invention by controlling the phase-separation treatment.

We claim:

1. A method of forming a porous antireflective surface layer on a glass article which comprises the steps of:
   providing an article of phase-separable glass which, upon heat treatment, is capable of separating into at least two phases of different solubility,
   heating the glass article to a temperature under the phase separation liquidus temperature, said temperature being sufficiently high and being applied for a sufficient duration of time to enhance phase separation in said glass; and thereafter
   contacting said glass article with a treating solution for a time sufficient to leach from a surface layer of said article the most soluble of said phases, at least the least soluble of said phases remaining as a porous skeletonized layer which is less than 10,000Å in thickness and which exhibits a gradient refractive index across the thickness of the larger.

2. The method of claim 1 wherein the step of heating said glass article comprises heating said article to at least 500° C.

3. The method of claim 1 wherein said glass article consists of a borosilicate glass and the step of heating said glass article comprises heating said article to a temperature in the range of 550°–700° C.

4. The method of claim 1 wherein said aqueous treating solution contains both hydrogen and fluoride ions.

5. The method of claim 1 wherein said glass article is composed of a glass having an oxide composition, in weight percent, of about 72–82% $SiO_2$, 13–16% $B_2O_3$, 3–10% total of alkali metal oxides, and 0–4% $Al_2O_3$, these constituents constituting at least about 93 weight percent of the glass.

6. The method of claim 1 wherein the step of contacting said glass article with an aqueous treating solution is terminated while the percent reflectance from said layer is at its first minimum level.

* * * * *

UNITED STATES PATENT AND TRADEMARK OFFICE
CERTIFICATE OF CORRECTION

PATENT NO. : 4,086,074             Page 1 of 2
DATED : April 25, 1978
INVENTOR(S) : Michael J. Minot, Ugur Ortabasi It is certified that error appears in the above-identified patent and that said Letters Patent are hereby corrected as shown below:

PATENT

Column 1, line 67, "of depth"
should be -- of a depth --.

Column 3, line 1, "including"
should be -- inducing --.

Column 6, line 47, "$N_2SiF_6$"
should be -- $H_2SiF_6$ --.

Column 7, line 22, "0.1"
should be -- 1.0 --.

Under TABLE I, "55"
should be -- B --.

Column 12, line 5, "In"
should be -- in --.

Column 13, line 40, "0.75μm"
should be -- 0.7μm --.

UNITED STATES PATENT AND TRADEMARK OFFICE
CERTIFICATE OF CORRECTION

PATENT NO. : 4,086,074

DATED : April 25, 1978

INVENTOR(S) : Michael J. Minot, Ugur Ortabasi

It is certified that error appears in the above—identified patent and that said Letters Patent is hereby corrected as shown below:

Column 14, line 25, "larger" should be -- layer --.

Signed and Sealed this

Twenty-seventh Day of May 1980

[SEAL]

Attest:

SIDNEY A. DIAMOND

Attesting Officer

Commissioner of Patents and Trademarks